March 14, 1961 K. C. ALWARD 2,974,648
VARIATION ARRANGEMENT
Filed April 13, 1953 2 Sheets-Sheet 1
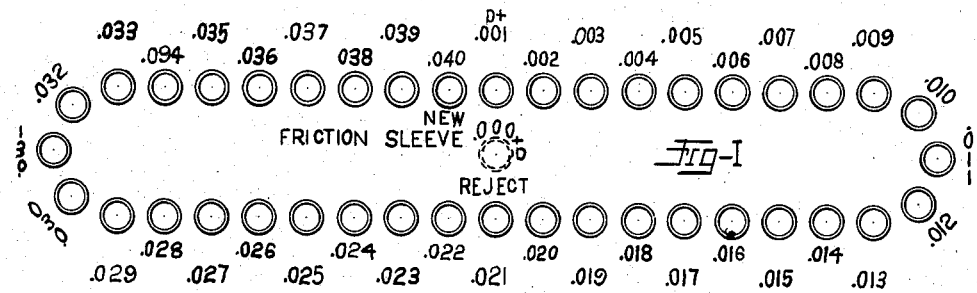
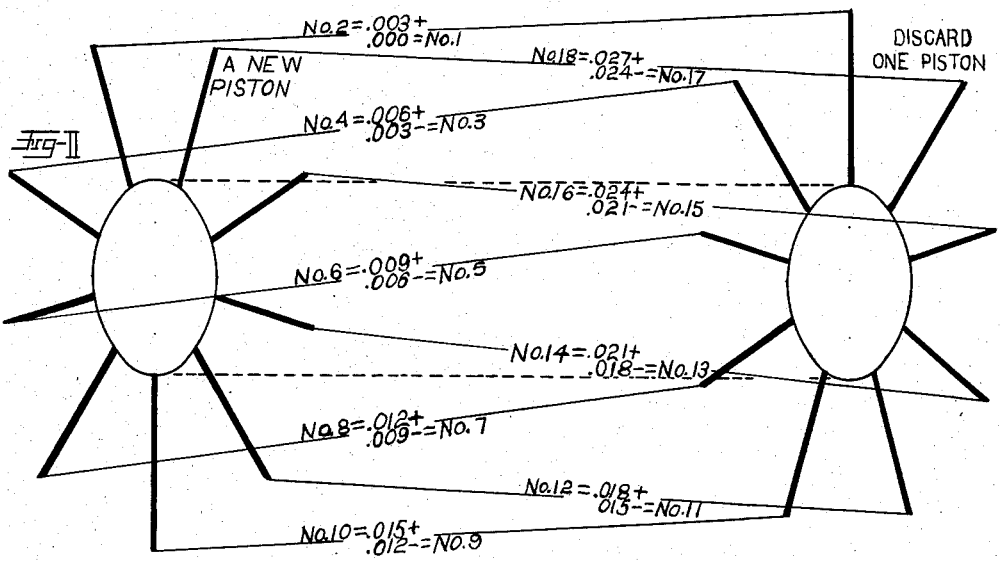
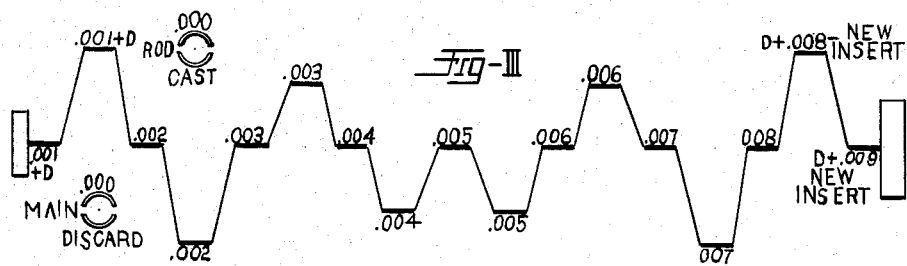
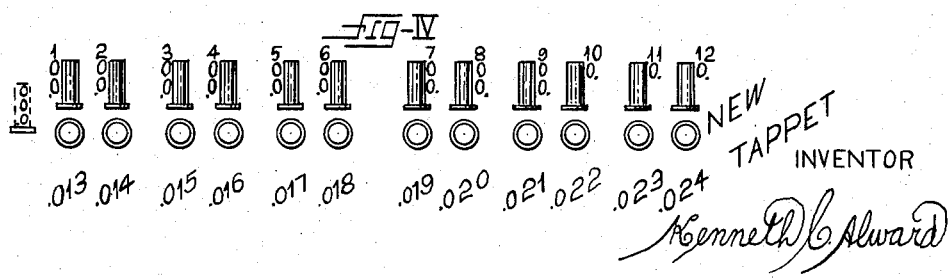
INVENTOR
Kenneth C. Alward March 14, 1961 K. C. ALWARD 2,974,648
VARIATION ARRANGEMENT
Filed April 13, 1953 2 Sheets-Sheet 2
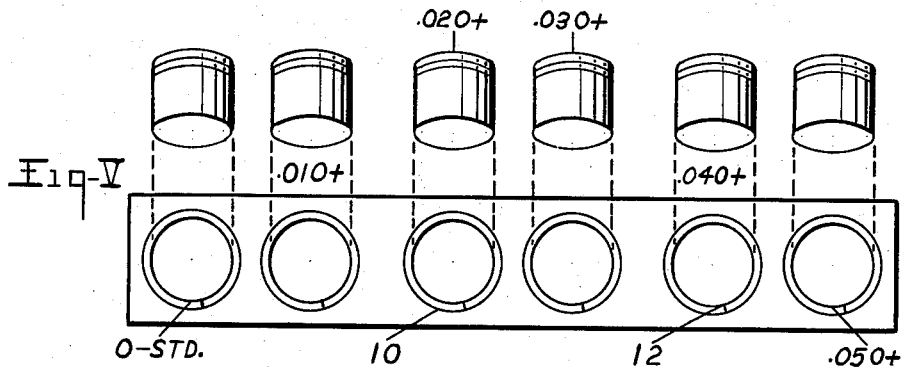
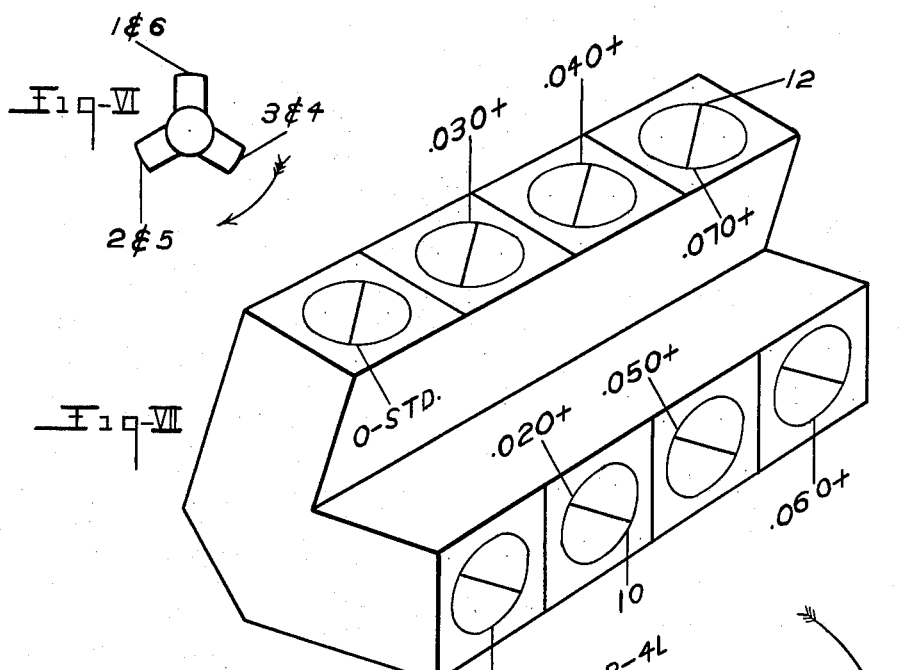
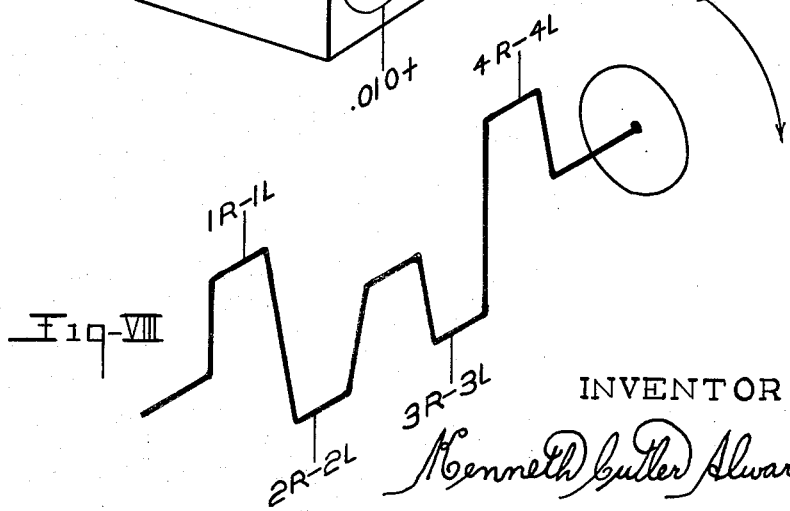
INVENTOR
Kenneth Butler Alward

United States Patent Office 2,974,648
Patented Mar. 14, 1961

2,974,648

VARIATION ARRANGEMENT

Kenneth C. Alward, Moweaqua, Ill.

Filed Apr. 13, 1953, Ser. No. 348,532

10 Claims. (Cl. 121—194)

This invention relates to friction devices whereas composite assemblies consist of component members bearing a frictionate relationship each to the other. Myriads of machine movements incorporate such as fixed spindles upon which revolve hollow members or vice versa as constituents of shaft and bearing assemblies. In the textile and weaving industry, e.g., multiple spindles abound with the machines. In fact, in most industries, in instances too numerous to mention, wherever plain bearings are used in multiple series, this invention has usefulness. Then, in manifold situations, instead of rolling friction, sliding friction surfaces are the combinations which exist, such as in cylinder and piston sets in engines, and multifarious others in the factories, on the farms, roads, homes, etc.

This is a continuation-in-part of my application No. 401,037—filed July 3, 1941, now Patent No. 2,635,021 and is a complete inclusion of the system of Variation Arrangement therein contained.

And so, for a principal object, this invention aims to provide an arrangement whereby the size of each of a series of units may be varied in steps of such sequence that a progressive shifting of the units will be reestablishatory of prime and original clearance between frictionate members.

Also an object is to arrange a systematic and uniform variation process of the diametrical size of all of the pistons within a single motor unit—corresponding to cylinders variation.

Still another object is to systematize a process for arranging the pistons such that the dynamic balance will remain inviolate.

Then an object is to apply the principle hereof to consecutive shifting of plain bearing members.

A further object is to exemplify the processes of variation and respectively shifting to such as the pistons and pins of multicylinder radial assemblies.

And again an object is to extend the arrangement to split bearing installations on crankshafts and the like.

A still further object is to explain the technique of variation and reestablishment for a six cylinder machine.

Yet another object is to utilize the invention in adaptation to eight cylinder and other various V-type machines. Any pertinence to pumps is hereby disclaimed.

Other objects of diverse and sundry advantages will become manifest upon development of the pertinent exemplification.

Identification of the drawings:

Fig. I is a diagrammatic view of a representative successive series of revolving frictionate members, arranged in diverse diametrical order for the purpose of renewing prime clearance.

Fig. II is a distended plan view of a twin-row radial aircraft engine, showing location of cylinders and corresponding pistons, featuring uniformly digressive diameters thereof and so arranged to accomplish dynamic balance.

Fig. III is a plan view of a multijournaled crankshaft devised to establish correct bearing clearance by shifting divisible inserts of altered step sizes.

Fig. IV is a side perspective view of a set of hydraulic tappets of progressively increasing diameters for a twelve (12) cylinder V-type engine, representing the principle of this invention in successively shifting loose or tight moving elements.

Fig. V is an elevational view of a cylinder block of a six cylinder engine, together with the accompanying pistons in perspective—showing a multicylinder machine with lined cylinders of successively smaller diameter, and companionate pairs of pistons equal to all other companionate pairs.

Fig. VI is an elevational view of the crankshaft of a six cylinder engine—showing synchroradial (coordinate) pairs of crankshaft arms.

Fig. VII is a diagrammatic view in perspective of an eight cylinder V-type engine, the axes of the cylinders of which converge in inclined planes, and having lined cylinders of successively smaller diameter with all companionate pairs as equal.

Fig. VIII is a plan view in perspective of the crankshaft of an eight cylinder V-type engine, showing relationship of synchroradial (coordinate) arms thereof to the engine pistons.

The invention is illustrated by the use of drawings for a clearer understanding thereof. Referring now to Fig. I, the friction sleeves may consist of either an external sleeve, both an internal and an external sleeve, or of an external sleeve friction member which is seized on a shaft —as explained in my application entitled Cylindrical Construction which accompanies this application. The exemplary forty bearing exhibits constitute a series of similar assemblies of typical bearings, which however, as the layout shows, are varied in their respective diameters. These alterations of diametrical sizes in progressive steps of one-thousandths (D.001) of an inch is for the overt and contemplated purpose of rematching bushings with next respective shafts or journals. So, when sufficient looseness so justifies, the bushing calibrated .000 is removed from its position which is now occupied by the D.001 (D.001) assembly, and accordingly said .001 is substituted. Usually, such a train of bearings will consist of bushing-holder cages, which are easily demounted or vice versa by aid of bolts, screws or other means. Each successive bushing-cage is thus transferred step by step until D.040 is arrived at, whereupon same is supplied with a new friction sleeve—whether male or no.

In such instance as where .001 would be inadequate to eliminate extraordinary clearance between wearing surfaces, the units may be shifted two or more steps as advisable. In situations of less multifarious units, sequential steps of diametrical variation steps of .005", .010" are adaptable.

Under this arrangement for diametrical variation of each and all of the pistons in an engine, corresponding to the same variation in the respective cylinders 10 or accomplished by differences in 10 sleeve only—variation of the inner dimension of the cylinders and the external diameter of the pistons is uniformly progressive—for example in steps of ten one-thousandths of an inch, as in Figs. V and VII.

Then, as the pistons become loose in relation to cylinder 10, each of the pistons except the smallest, is shifted to the next successively smaller cylinder. One new oversize piston is installed in the cylinder of largest diameter—like legend in Fig. II.

According as to whether liquid enters the motor block from the front or rear end, such extremity will cool more effectively. The thickest pistons will be arranged at the coolest end of the block such that expansion of same will be equalized.

In order to maintain dynamic balance in employing different diameters of pistons, corresponding to differences in weights, I have calculated in this invention an arrangement system by which static and dynamic balance will remain the same.

In many internal-combustion engines of the multi-cylinder type, pairs (of two) crankshaft arms (throws or crank pins) project perpendicularly from the axis of the shaft at the identical radius angle respective relatively to other pairs and therefore are in the same radial plane (coordinate), as in Figs. VI and VIII.

When coordinate crankshaft arms in the same radial plane communicate by means of a connecting rod with their respective pistons, said pistons will reciprocate together, synchronously and in parallel; so, such pairs of pistons are called companionate.

Then, with the preceding correlation in mind, the pistons are so arranged that the sum of the oversize weight of any pair of two differently diametered companionate pistons is the same as the equal aliquot sum of the oversize weight of any other pairs of companionate pistons. Therefore, the motor will be in balance, as according to the following example.

The oversize aliquot weight of a companionate pair of pistons is calculated by the method of the number of pistons less one multiplied by the arbitrary variation, as .005″, .010″, .020″.

As an example shown in Fig. VI, I first determine the pairs of crankshaft arms as being Nos. 1 and 6, Nos. 2 and 5, and Nos. 3 and 4 (pairs being one hundred and twenty degrees to each other), as in most six cylinder motors. Then, I select the variation, such as ten one-thousandths of an inch (.010″). Then, I multiply six minus one or five by the .010″, and the product is .050″. Then, as shown in Fig. V, I make No. 1 piston and cylinder as standard or .000 and pair it with its companionate No. 6 of .050; joining No. 2 of .010—plus .040″—for No. 5, their sum will be the same 050″; and adding No. 3 as .30″— plus .020″—for No. 4, their sum will be the equal aliquot .050″.

The motor will then be in balance, just as any of like type not using such variation arrangement. The pistons and cylinders would increase in diameter in the order, 1—2—3—4—5—6 and inversely decrease in the reverse order to shift, remaining balanced.

Clarity of the principle of balance and the procedure in shifting is further exemplified by Fig. II—which represents spread cylinder rows of a twin-row radial aircraft engine. Diagonally proximate pistons of each row, such as 1 and 2 . . . 17 and 18, are considered as companionate pairs. Using positive (+) and negative (−) numbers to represent respective oversizes and undersizes, the variational sum of each pair adds to the equal amount of .003″+ for each and every so designated pair. Upon the shifting of each piston to the next lesser cylinder, the variant sum of pair sizes i.e., .003″ will remain the same, with a new piston.

The order of successive size decrease will be:

Nos. 18, 16, 14, 12, 10, 8, 6, 4, 2, 1, 3, 5, 7, 9, 11, 13, 15, 17.

Many layouts can be made of the foregoing method.

In Fig. III this split type of bearing is usually called an insert. Hereof, each crankshaft journal is allocated a differential in size of .001″ from the next. In proceeding to shift this arrangement for the first time, the rod insert .000 is removed and same is replaced by the D.001″ insert which has been procured from the position at which D.002″ is to be installed. This process of progressive shifting is repeated in steps thereof until the No. 8 journal is at hand. Thereupon, at this point No. 8 rod-journal has installed a new insert having .008″ oversize. In some cases, the original new journal of .007″ will be proper.

In the schedule for the main bearings of Fig. III, a similar process of shifting is employed i.e. substituting .001 for .000 and No. 3 for No. 2 and so on until No. 9 is encountered, whereby a new .009 is eligible or even a new .008 may be preferable.

Referring now to Fig. IV, the movements of rotation, oscillation and reciprocation are in the set of 24 tappets for a 12 cyl. V-type engine. Each successive tappet varies .001″ (or otherwise selected) in size, and so, each tappet may be shifted to a small guide (new .024 for largest guide), or two-stage shift is eligible.

In arranging the order of shifting for the present modern V-type engines it is necessary only that the pairs of pistons which join to the same journal, being opposites in right and left banks, be balanced with the same spread of difference in comparison as have the other opposite pairs. If the spread is .005, the end cylinders may be D.000 and D.005; the next set may be D.010 and D.015; the third set from the end are D.020 and D.025; and the opposite end will be D.030 and D.035.

Tallying the result of balance is the remainder:

| #2___ D.005 | #4___ D.015 | #6___ D.025 | #8___ D.035 |
|---|---|---|---|
| 1___ D.000 | 3___ D.010 | 5___ D.020 | 7___ D.030 |
| .005 | .005 | .005 | .005 |

Otherwise, the steps of diametrical variation may be arranged in 1—3—5—7—8—6—4—2 order.

Such begins with No. 1 as D.000 and No. 3 as D.005; then—No. 5 as D.010, No. 7 as D.015; then, across over to the opposite bank—No. 8 as D.020, No. 6 as D.025, No. 4 as D.030, and No. 2 as D.035. Now checking the sum of the oversizes:

| #1___ D.000 | #3___ D.005 | #5___ D.010 | #7___ D.015 |
|---|---|---|---|
| 2___ D.035 | 4___ D.030 | 6___ D.025 | 8___ D.020 |
| .035 | .035 | .035 | .035 |

Or, the same may be arranged in 1—3—5—7—2—4—6—8 order.

Now, checking the remainder:

| #2___ D.020 | #4___ D.025 | #6___ D.030 | #8___ D.035 |
|---|---|---|---|
| 1___ D.000 | 3___ D.005 | 5___ D.010 | 7___ D.015 |
| .020 | .020 | .020 | .020 |

This same principle may be applied to V-12, V-16 or X-24 types.

An opportune time to shift pistons is when new rings are installed; such reestablishment tightens pistons, stops noise, and therefore prevents and forestalls the damage to the ring grooves due to side slap fluctuation of a loose piston. When this arrangement is absent, pistons continue to work looser and looser. With this built in—the precaution can be used at first "ring job" which not procrastinated—keeps piston grooves snug.

Different and various throw angles are in V-8 crankshafts. In the V-type engine, as shown in Fig. VII (or its double, the X-type—made by Allison and Rolls-Royce in a 24 cyl. aircraft engine), I first select the optional difference in sequential pistons and cylinders. Then, in a V-eight with steps of .010″ variation, I multiply said .010″ by seven (eight minus one), which product is .070″. Conventional V-8's had their crankshaft arms at 180 degrees and No. 1 and 4, 2 and 3 in the same radial plane (coordinate), as in Fig. VIII, and the same cooperative pairs of pistons on either side as companionate. Thus making No. 1 right as .000 and No. 4R as .070″—(+=oversize), the sum of the oversizes will then be .70″ (.070″ plus .000), as shown in Fig. VII. Then reversing sides, No. 1 left as .010″+ plus .060″+ for No. 4L, the sum will be .070″+. Alternating to No. 2R as .030″+ plus .040″+ for No. 3R equals .070″. Then reversing to No. 2L as .020″ and then plus .050 for No. 3L, the sum will be .070, the same as with each companionate pair.

Also, all of the rights—.000+.030+.040+.070=.140″.
Also, all of the lefts—.010+.020+.050+.060=.140.
Order of increase: 1R—1L—2L—2R—3R—3L—4L—4R.

The motor will then be in balance, the same as any motor of like type arranged with pistons of equal size, and when the pistons are shifted, proportions will remain the same, as each piston is to be shifted in the same relative predetermined order to immediately smaller cylinders, a new oversize being installed in the largest cylinder.

Other sequential arrangements may be selected—but they would come within the scope of this invention if they characterize equal aliquot pairs and the same principle would apply in machines having 12, 16 or 24 cylinders.

I claim, therefore, as my invention:

1. In a machine having a series of similar frictionate annular sleeves which are subject to discrepancies in diameter an arrangement on account of which said sleeves possess diameters which successively vary uniformly.

2. In a machine having split bearings in combination with journals of a crankshaft, the said journals being dimensioned in minute sequential steps with uniform differences in diameters, which said difference is arbitrarily selectable as the estimated and foreboding amount of wear which will accrue.

3. A method of reestablishing prime clearance in journals according to claim 2 in which said split bearings are shifted to consecutive journals to compensate for wear.

4. In a series of frictionate members having rotary, oscillatory and reciprocatory movement, a system by which the diameter of each progressive member varies in sequential steps from next members adjacent thereto.

5. Incorporated in a cylinder arrangement a process of successively shifting, within a single operative unit, all except one of the elements of a type disposed for movement in a cylinder bore, which said moving members are prearranged to be of uniformly progressive diameters and are shifted to consecutive or otherwise predetermined cooperating cylinders, which are purposely arranged in a varying sequence of uniformly degressive diameters, which said cylinders optionally being treated by a resurfacing operation, the aforesaid shifting method being reestablishatory of the original and correct space relationship between cylinders and pistons thereof, as this invention resolves to consummate such result.

6. In a process for reestablishing correct clearance space between moving elements of a series thereof and being fitted within bore holes constituting a corresponding series thereto an arrangement by which each of a series of elements is varied in conformity with a uniform variation plan and then proceeding to shift said elements to locations in relative sequence to vary the clearance space thereof.

7. In a six cylinder machine a set of cylinders successively varying in diameter by ten-thousandths of an inch and having three pairs of moving elements which actuate companionately and at 120 degrees each from the other two pairs thereof and comprising three pairs of similar pistons each being identical except for differences in oversizes and each pair thereof comprising a balanced sum of numerically equal oversize equally balanced to the combined oversize sum of either of the other companionate pairs thereof.

8. In a prime mover machine employing split-type connecting-rod bearings superimposed over the multiple journals of a crank-shaft, a system featuring minuteness of variation in the diameter of respective components in uniform progressive steps.

9. In a machine having a multiple of piston pins oscillating within piston bosses, a concerted plan whereby each successive pin thereof is uniformly varied in diameter in respect to the adjacent pins and/with such deviation corresponding to the same variation in regard to piston pin bosses.

10. An internal combustion engine having a crankshaft and comprising a multiple series of pistons which vary in diameter each to another by a progressive uniform constant and a systematic arrangement of allocating said pistons of varying size such that static and dynamic balance will remain undisturbed.

References Cited in the file of this patent

UNITED STATES PATENTS

| | | |
|---|---|---|
| 2,181,774 | Williams | Nov. 28, 1939 |
| 2,635,021 | Alward | Apr. 14, 1953 |